United States Patent
Yi et al.

(10) Patent No.: US 7,418,940 B1
(45) Date of Patent: Sep. 2, 2008

(54) FUEL INJECTOR SPRAY PATTERN FOR DIRECT INJECTION SPARK IGNITION ENGINES

(75) Inventors: Jianwen James Yi, Canton, MI (US); Claudia Olivia Iyer, Canton, MI (US); Brad Alan VanDerWege, Canton, MI (US); Steven Wooldridge, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/847,381

(22) Filed: Aug. 30, 2007

(51) Int. Cl.
*F02B 17/00* (2006.01)

(52) U.S. Cl. .................................... 123/295

(58) Field of Classification Search ............. 123/295, 123/298, 299, 305
See application file for complete search history.

(56) References Cited

U.S. PATENT DOCUMENTS

| | | | |
|---|---|---|---|
| 4,286,557 A * | 9/1981 | Klomp | ............. 123/298 |
| 4,790,270 A | 12/1988 | McKay et al. | |
| 5,713,325 A | 2/1998 | Yoshida et al. | |
| 5,915,353 A | 6/1999 | Matsumura | |
| 5,941,207 A | 8/1999 | Anderson et al. | |
| 6,334,427 B1 | 1/2002 | Nakayama et al. | |
| 6,378,488 B1 | 4/2002 | Trigui et al. | |
| 6,675,766 B2 | 1/2004 | Miyajima et al. | |
| 6,705,274 B2 * | 3/2004 | Kubo | ............. 123/295 |
| 6,715,463 B2 | 4/2004 | Kudo et al. | |
| 6,725,828 B1 | 4/2004 | Han et al. | |
| 6,789,754 B2 | 9/2004 | Peterson, Jr. | |
| 6,948,474 B2 | 9/2005 | Yamaguchi et al. | |
| 7,104,250 B1 * | 9/2006 | Yi et al. | ............. 123/305 |
| 2003/0234006 A1 | 12/2003 | Saito et al. | |
| 2004/0055560 A1 | 3/2004 | Nakayama et al. | |

OTHER PUBLICATIONS

SAE2000-01-0656, "Modeling of the Interaction of Intake Flow and Fuel Spray in DISI Engines", Jianwen Yi, Zhiyu Han, et al., SAE 2000 World Congress, Mar. 6-9, 2000.

* cited by examiner

*Primary Examiner*—Hieu T Vo
(74) *Attorney, Agent, or Firm*—Allan J. Lippa; Bir Law, PLC; David S. Bir

(57) ABSTRACT

A system and method for operating an internal combustion engine include injecting fuel through a plurality of fuel jets of a fuel injector directly into a corresponding cylinder with at least a first plurality jets oriented to primarily support operation in a stratified mode and a second plurality of jets oriented to primarily support operation in a homogeneous mode. The first plurality of jets is oriented to spray fuel generally downward toward the piston bowl and the second plurality of jets is oriented to spray fuel generally across the cylinder toward the exhaust valves. The spray jets reduce or eliminate valve, liner, and piston wetting while providing good mixing in homogeneous mode and good combustion stability for light stratified charge during cold starts to achieve desired targets for feedgas emissions and combustion efficiency.

20 Claims, 5 Drawing Sheets

FUEL INJECTOR SPRAY PATTERN FOR DIRECT INJECTION SPARK IGNITION ENGINES

BACKGROUND

1. Technical Field

The present disclosure relates to fuel injection for direct injection spark ignition internal combustion engines.

2. Background Art

Direct-injection spark-ignition (DISI) internal combustion engines have been developed to reduce fuel consumption and feedgas emissions of gasoline engines. DISI combustion technologies can generally be classified as either homogeneous charge or stratified charge systems. In homogeneous charge systems, the engine operates only in the homogeneous mode where the air-fuel mixture of the charge in the combustion chamber is generally well-mixed or homogeneous throughout the chamber. Stratified charge combustion systems operate in a stratified mode with layers or strata of richer air/fuel ratio near the spark plug and progressively leaner layers below under certain operating conditions, such as low to medium load and low to medium engine speed, for example, while operating in a homogeneous mode otherwise. Systems designed for homogeneous mode operation generally use an injector having an evenly distributed fuel spray that can mix well with air to create a homogeneous charge. Systems designed for stratified charge mode operation require the richer fuel-air mixture in the region of the spark plug gap location and generally use an injector having jets closely arranged to form a suitable fuel cloud around the spark plug. Injector spray patterns should also provide stable combustion for cold starting and minimize liquid fuel contacting the cylinder wall, valves, and spark plug to prevent fouling and/or corrosion and to properly control feedgas emissions. To operate in the homogeneous mode, stratified charge systems may require design compromises or additional devices such as a variable charge motion control device or air assisted injection to achieve sufficient charge homogeneity. These design compromises may increase complexity and associated cost and may lower the efficiency of stratified mode operation.

SUMMARY

A system and method for operating a direct-injection internal combustion engine having a plurality of cylinders each having associated intake/exhaust valves, an ignition source having an associated ignition location, a fuel injector, and a piston having a combustion bowl formed in a top surface thereof, include injecting fuel in a plurality of fuel jets of the fuel injector directly into a corresponding cylinder with the fuel being injected in at least a first plurality of jets oriented generally downward toward the piston bowl to primarily support operation in a stratified mode and a second plurality of jets oriented to spray fuel generally across the cylinder toward the exhaust valves to primarily support operation in a homogeneous mode.

In one embodiment, a direct-injection internal combustion engine includes a fuel injector having a first plurality of jets that includes a middle jet with an off-axis angle, theta, of between about 50 degrees and about 55 degrees and a beta angle of about zero degrees, with an additional jet on either side of the middle jet and having an off-axis angle of between about 47 degrees and about 55 degrees and a beta angle of between about +/−14 degrees and +/−29 degrees. A second plurality of jets includes a middle jet with an off-axis angle of between about 10 degrees and about 15 degrees and a beta angle of about zero degrees, with an additional jet on either side of the middle jet having an off-axis angle of between about 33 degrees to about 39 degrees and a beta angle of between about +/−17 degrees and +/−27 degrees.

The present disclosure includes embodiments having various advantages. For example, the injector spray pattern of the present disclosure provides a rich air-fuel mixture cloud at the spark plug location for enhanced cold start combustion stability with reduced cylinder wall wetting at part and full load operating conditions. In addition, the system and method of the present disclosure provide improved air-fuel mixture homogeneity at high-speed wide-open throttle operating conditions. Computer simulations and dynamometer testing indicate that the injector spray patterns of the present disclosure should provide improved performance for various operating speeds and loads resulting in reduced feedgas emissions and increased fuel efficiency for direct injection, spark-ignition engines.

The above advantages and other advantages and features will be readily apparent from the following detailed description of the preferred embodiments when taken in connection with the accompanying drawings.

DETAILED DESCRIPTION OF THE PREFERRED EMBODIMENT(S)

As those of ordinary skill in the art will understand, various features of the embodiments illustrated and described with reference to any one of the Figures may be combined with features illustrated in one or more other Figures to produce alternative embodiments that may not be explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to a four-stroke, multi-cylinder, direct-injected, spark-ignition internal combustion engine having a "V" configuration of cylinders. Those of ordinary skill in the art may recognize similar applications or implementations with other engine/vehicle technologies and configurations including but not limited to in-line configurations, for example.

Figure 1:
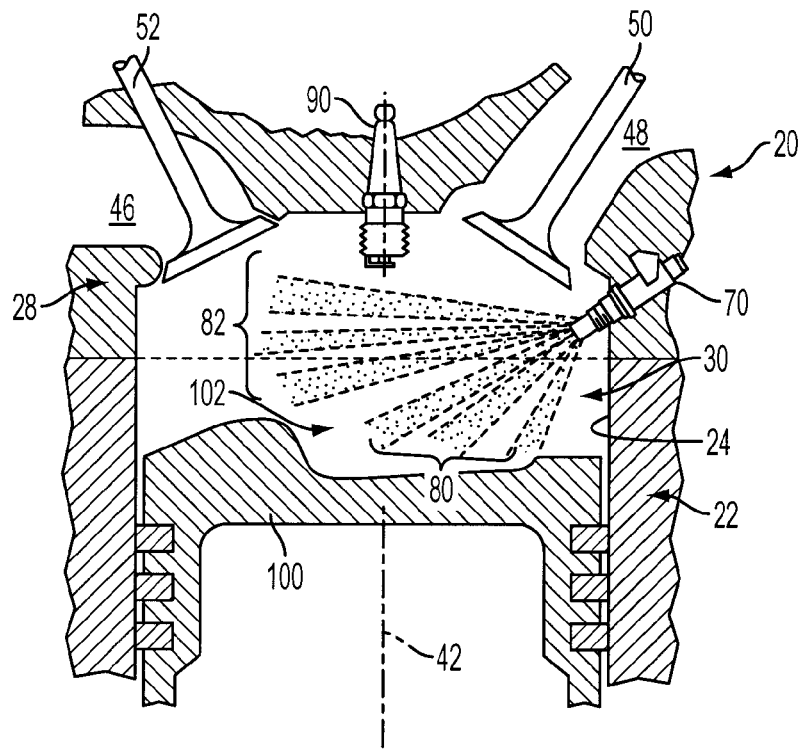
FIG. 1 is a cross-section of a representative cylinder illustrating a fuel injector spray pattern according to one embodiment of the present disclosure.

FIG. 1 is a cross-section of a representative cylinder or combustion chamber of a multiple cylinder direct-injection internal combustion engine illustrating operation of one embodiment of a system or method for operating a direct injection engine according to the present disclosure. Engine 20 includes an engine block 22 having a plurality of cylinder bores 24 that cooperate with cylinder head 28 to form combustion chambers 30. Cylinder head 28 includes various exhaust ports 46 and intake ports 48. As will be appreciated by those of ordinary skill in the art, although one preferred embodiment includes two intake ports and two exhaust ports per cylinder (only one of each being shown in FIG. 1), the present disclosure also applies to engine configurations having one or more intake ports and/or one or more exhaust ports.

Each combustion chamber 30 includes an intake valve 50 for each intake port and an exhaust valve 52 for each exhaust port. Intake valve 50 selectively couples combustion chamber 30 to an associated intake manifold (not shown). Similarly, exhaust valve 52 selectively couples combustion chamber 30 to an associated exhaust manifold (not shown). Of course, the intake manifold and/or exhaust manifold may be integrally formed within cylinder head 28, or may be separate components depending upon the particular application. Intake valves 50 and exhaust valves 52 may be operated using any of a number of known strategies including a conventional camshaft arrangement, variable camshaft timing and/or variable lift arrangements, or using electromagnetic valve actuators, for example.

Each combustion chamber 30 includes an associated side-mounted fuel injector 70 mounted in cylinder head 28 and extending through a side portion of combustion chamber 30. The longitudinal axis 72 of fuel injector 70 may be coincident with, or be disposed at an angle relative to the cylinder longitudinal axis 42 depending upon the particular application and implementation. During operation, in response to one or more corresponding fuel injection signal(s) generated by the engine controller, fuel injector 70 sprays fuel through at least two groups of holes or jets substantially simultaneously directly into combustion chamber 30 to create a desired fuel spray pattern. A first group of jets 80 is oriented to spray fuel generally downward toward a combustion bowl 102 formed in the top surface of piston 100, primarily supporting stratified charge formation suited for engine starting and other operating conditions suitable for stratified mode. A second group of jets 82 is oriented to spray fuel generally across combustion chamber 30 toward exhaust valve(s) 52, primarily supporting homogeneous charge formation.

As also shown in FIG. 1, the first plurality of jets 80 includes a center or middle jet with two side jets that may be generally symmetrically oriented relative to the center jet to form a fuel air mixture cloud substantially within combustion bowl 102 of piston 100 during engine starting. Similarly, second plurality of jets 82 may include a center jet oriented to spray fuel generally between two intake valves 50 and across combustion chamber 30 toward exhaust valves 52. Two side jets are also oriented to spray fuel across combustion chamber 30 toward exhaust valves 52. As illustrated and described in greater detail below, the fuel jets 80, 82 are oriented to reduce or eliminate wetting of intake valves 50, exhaust valves 52, ignition source 90, piston 100, and cylinder bore 24. In the embodiment illustrated, six fuel jets were used to provide sufficient atomization of fuel while reducing or eliminating clogging of the injector. Fuel from the first plurality of jets 80 penetrates into the cylinder generally farther than fuel from the second plurality of jets 82 as measured along cylinder axis 42, while fuel from the second plurality of jets 82 penetrates across the cylinder generally farther than fuel from the first plurality of jets 80 as measured normal or perpendicular to the cylinder axis 42.

As also illustrated in FIG. 1, each combustion chamber 30 includes an ignition source, such as a spark plug 90 that extends through the cylinder roof. A piston 100 is disposed for reciprocating movement within each cylinder bore 24 and is coupled in a conventional manner to a crankshaft by a connecting rod (not shown). As described above, piston 100 may include a top portion or crown having a combustion bowl 102 formed therein to facilitate desired air-fuel mixture cloud formation, particularly during light stratified charge operation, such as during cold starts, for example. However, combustion bowl 102 may include various features to cooperate with fuel sprays 80, 82 to enhance stable combustion during operation in both stratified charge and homogeneous charge modes.

Figure 2:
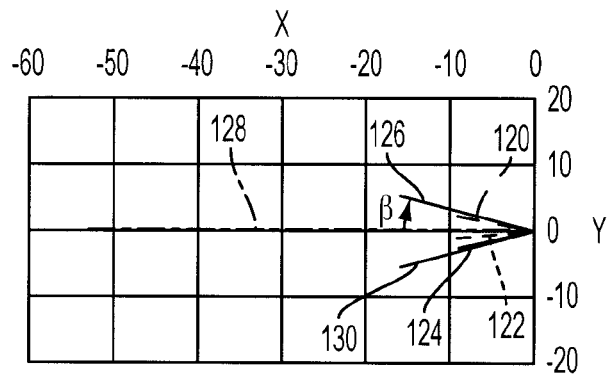
FIG. 2 is a graphical representation of the injector spray jets axes from a top view according to one embodiment of the present disclosure.
Figure 3:
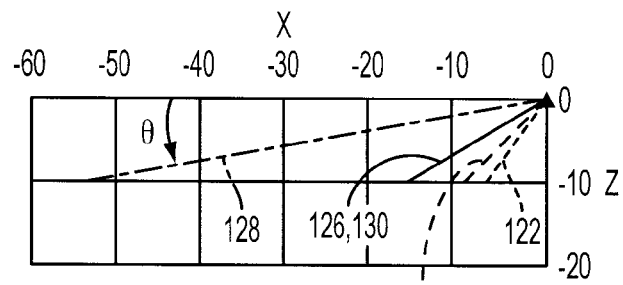
FIG. 3 is a graphical representation of the injector spray jets axes from a side view according to one embodiment of the present disclosure.

FIGS. 2 and 3 are schematic representations of the orientations of the spray jet axes for one embodiment of a fuel injector spray pattern according to the present disclosure. FIG. 2 shows a top view representation of the injector spray jet axes using a coordinate system having its origin at the tip of the fuel injector with the Y-axis parallel to the crankshaft and the Z-axis parallel to the cylinder axis 42 (FIG. 1). The X-axis is normal or perpendicular to the Y-axis and Z-axis.

The jet axes are defined at a fixed Z-position of 10 mm below the injector tip. Each line represents the projection of one of the jet axes on the X-Y or X-Z plane, respectively. The beta ($\beta$) angle shown in FIG. 2 refers to the angle between the X-axis and the projection of the spray jet axis on the X-Y plane. The injector represented in the schematic of FIG. 2 includes six jets with a first group or plurality of jets 120, 122, 124 oriented to spray fuel generally downward toward the combustion bowl of the piston. The second group of jets includes jets 126, 128, 130, which are oriented to spray fuel generally across the cylinder towards the exhaust area.

As also shown in FIG. 2, the first group of jets includes a center or middle jet 122 with two side jets 120, 124, which are approximately symmetrically positioned relative to middle jet 122 in this embodiment. However, side jets 120, 124 may be asymmetrically positioned in some applications or implementations. Similarly, the second group of jets includes a center or middle jet 128 and two side jets 126, 130, which are approximately symmetrically positioned relative to middle jet 128 in this embodiment, although may be asymmetrically positioned in other applications. Middle jet 128 is oriented to spray fuel generally between the intake valves and across the cylinder toward the exhaust valves.

FIG. 3 is a graphic illustrating a side view of the spray jet axes. The angle theta ($\theta$), also referred to as the off-axis angle, is the vector angle between the X-axis and the corresponding spray jet axis. Computer simulation of various spray jet orientations resulted in desired angular ranges for the off-axis angle and beta angle for a six-jet injector indicated in the following table, with typical manufacturing tolerances being +/−2.5 degrees. Angle values for one embodiment that was dynamometer tested with results illustrated and described with reference to Figures herein are indicated parenthetically.

| Spray Jet No | $\beta$ | $\theta$ |
|---|---|---|
| 120 | 14.2° to 29.1° (14.2) | 47.6° to 55.2° (47.6) |
| 122 | 0° (0) | 50° to 55° (55) |
| 124 | −14.2° to −29.1° (−14.2) | 47.6° to 55.2° (47.6) |
| 126 | 17.6° to 27.5° (18.2) | 33° to 39.1° (34.3) |
| 128 | 0° (0) | 10° to 15° (10) |
| 130 | −17.6° to −27.5° (−18.2) | 33° to 39.1° (34.3) |

Of course the actual values for the jet angle axes may vary depending upon the particular application and implementation. The values above were determined to provide improved performance with respect to reduced carbon monoxide (CO) feedgas emissions and increased combustion efficiency relative to a representative port fuel injection application based on dynamometer data and computer simulation in combination with design considerations as noted herein. In general the spray jets were designed to avoid valve wetting and to have reduced liner and piston wetting. Jets 126, 128, and 130 were designed to provide good mixing in homogeneous charge operation as previously described. Jet 128 was designed to target between the intake valves and to reach as far as possible on the exhaust side of the cylinder, but at the same time have reduced liner wetting. Jets 126 and 130 were oriented to have minimal valve wetting as valve wetting is a source of soot. Jets 120, 122, and 124 were designed to provide good combustion stability for light stratified charge at cold start by orienting them so the fuel spray is substantially contained in the shallow combustion bowl of the piston. This facilitates formation of an appropriate fuel-air cloud that is maintained in the combustion bowl for cold start operation. Jets 120, 122, and 124 were also designed to have reduced piston wetting, particularly jet 122.

More particularly, with respect to jet 120, beta angles below the range disclosed may result in higher smoke production due to higher piston wetting while angles above the range may result in the spray being outside of the combustion bowl and bore washing or valve wetting issues. Similarly, if the off-axis angle of jet 120 is less than the stated range, a less stable fuel-air mixture will form near the spark plug. Whereas, if the off-axis angle is greater than the stated range, excessive piston wetting may lead to higher smoke. With respect to jet 122, beta angles that stray significantly from zero degrees may result in liquid fuel impinging on the intake valves. Off-axis angle values below the stated range may result in a less stable air-fuel mixture formed near the spark plug location whereas values above this range may result in higher smoke due to higher piston wetting. Similarly, off-axis angles exceeding the stated range for jet 124 may result in excessive piston wetting while values below this range may result in a less stable mixture formed near the spark plug. Beta angles exceeding the range for jet 124 may result in fuel outside of the combustion bowl of the piston and/or valve wetting whereas beta angles below this range may result in excessive smoke.

Jets 126, 128, and 130 are oriented to primarily support homogeneous charge formation, but have similar design considerations as those for the jets of the first group oriented to support stratified charge formation. During stratified charge and cold start operation with late injection timing, jets 126 and 130 are targeted to be contained in the piston bowl. In particular, with respect to jet 126, beta angles exceeding the stated range may result in intake valve wetting while values below this range may result in excessive smoke and less homogenous mixtures. Off-axis angles above the stated range may result in excessive fuel contacting the piston and less homogeneous mixtures while values below this range may result in valve wetting and may not have the desired combustion bowl containment for cold start stability. With respect to jet 128, as the beta angle moves away from zero degrees, the likelihood of fuel contacting the intake valve(s) increases. Off-axis angles above the stated range may result in less homogeneous mixtures on the exhaust side of the combustion chamber and undesirable smoke during homogeneous operation while values below this range may result in wall wetting on the opposite side of the cylinder and/or spray impingement on the top surface of the injector pocket. With respect to jet 130, beta angles above the stated range may result in intake valve wetting while values below this range may result in undesirable amounts of smoke and less homogeneous mixtures. Off-axis angles above the stated range may result in excessive fuel contacting the piston and less homogeneous mixtures while values below this range may result in valve wetting and do not provide the desired containment within the piston combustion bowl during cold start operation.

Figure 4:
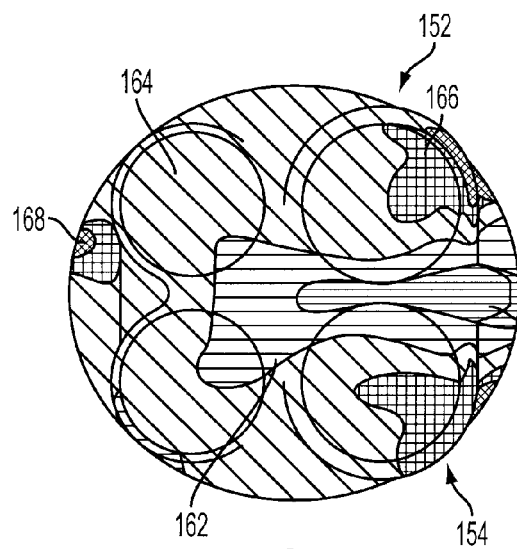
FIG. 4 is a top-view contour plot illustrating air/fuel ratio within a representative cylinder having an injector according to the present disclosure at part-throttle operation.
Figure 5:
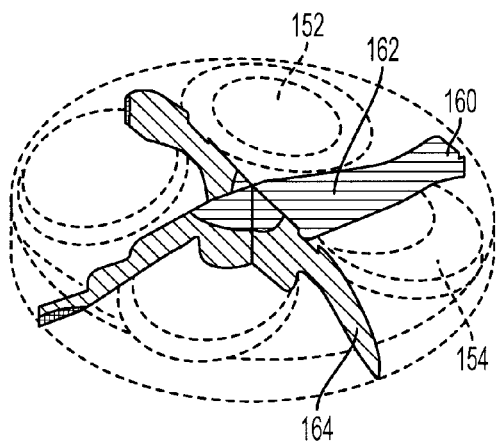
FIG. 5 is a contour plot illustrating air/fuel ratio along X=0 and Y=0 planes within a representative cylinder having an injector according to the present disclosure at part-throttle operation.
Figure 6:
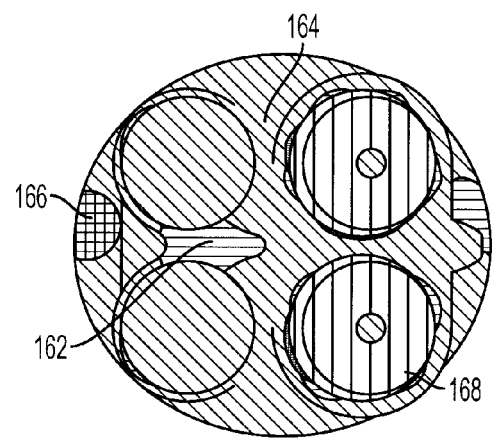
FIG. 6 is a top-view contour plot illustrating air/fuel ratio within a representative cylinder having an injector according to the present disclosure at wide-open throttle operation.
Figure 7:
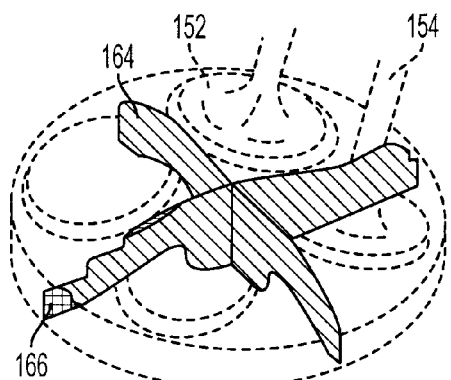
FIG. 7 is a contour plot illustrating air/fuel ratio along X=0 and Y=0 planes within a representative cylinder having an injector spray pattern according to the present disclosure at wide-open throttle operation.

FIGS. 4-7 are plots illustrating air-fuel ratio distribution within a representative cylinder using a computer model of a cylinder having two intake valves and two exhaust valves with a six-jet injector according to the present disclosure. The plots of FIGS. 4 and 5 represent operation at part-load and at a crank angle of 20 degrees before top dead center (BTDC). FIGS. 6 and 7 represent operation at 6000 rpm wide-open throttle at a crank angle of 20 degrees BTDC. FIGS. 4 and 6 are top views of the cylinder, while FIGS. 5 and 7 illustrate air-fuel ratio distribution between the cylinder roof and piston surface in the X=0 and Y=0 planes. As shown in the Figures, the air-fuel ratio is richest at part load near the injector location 150, which is mounted on the side of the cylinder head below the intake valves 152 and 154, and the mixture has an air/fuel ratio of 10 or below in region 160. Region 162 represents an air-fuel ratio of about 12 with region 164 representing an air-fuel ratio of about 15. Region 166 represents an air-fuel ratio of about 18 with region 168 representing an air-fuel ratio of 20 or above. In FIG. 6, because the intake port is still part of the computational domain at this time, region 168 shows the mixture in the intake port just above the intake valves, which is a very lean mixture. Actually, the air-fuel mixture in the cylinder just below the intake valves corresponds to an air-fuel ratio of about 15, similar to region 164. The wide-open throttle operation has very good mixture homogeneity.

Figure 8:
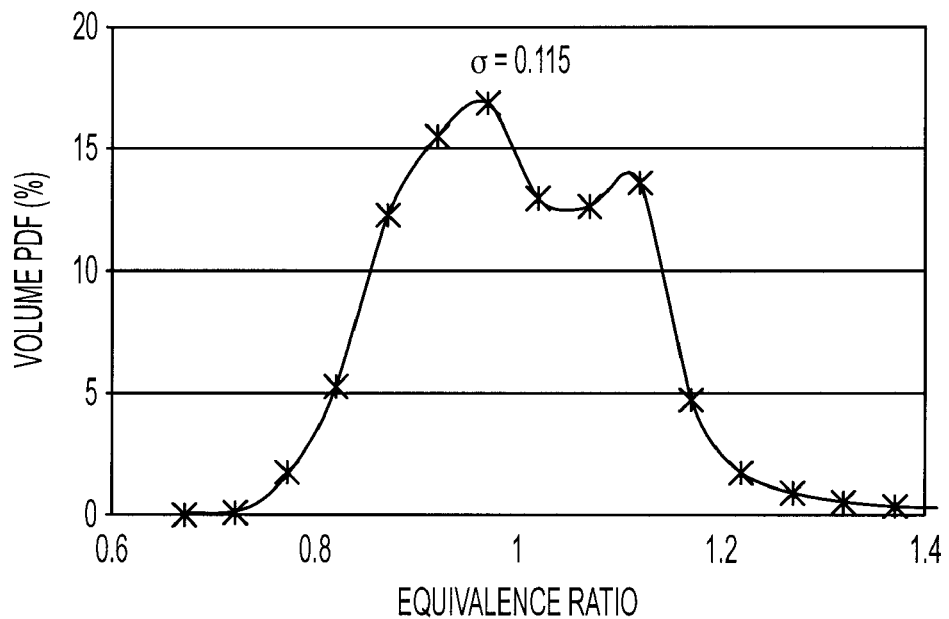
FIG. 8 is a graph illustrating equivalence ratio distribution within a representative cylinder volume having an injector spray pattern according to the present disclosure at part-throttle operation.
Figure 9:
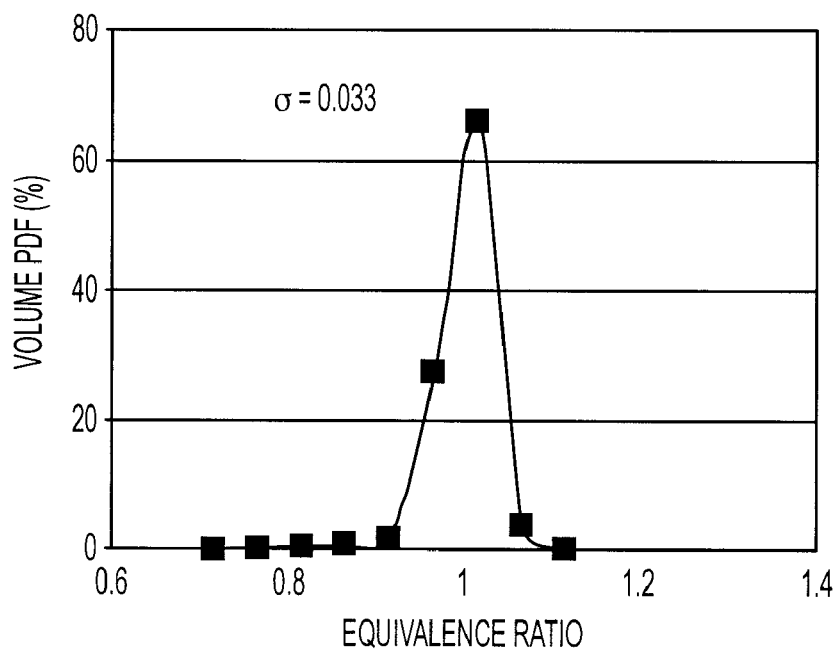
FIG. 9 is a graph illustrating equivalence ratio distribution within a representative cylinder volume having an injector spray pattern according to the present disclosure at wide-open throttle operation.

FIGS. 8 and 9 are graphs illustrating the equivalence ratio distribution within the cylinder volume at 20 degrees BTDC of compression. FIG. 8 illustrates the equivalence ratio distribution for part load operation, while FIG. 9 illustrates the equivalence ratio distribution for wide-open throttle at 6000 rpm. The equivalence ratio is defined as the ratio of the actual fuel-air ratio to the stoichiometric fuel-air ratio so that an equivalence value of unity corresponds to a stoichiometric mixture. Equivalence ratios less than one represent lean mixtures with equivalence ratios greater than one representing rich mixtures. Using the equivalence ratio distribution, the standard deviation (sigma, σ) can be calculated and provides an indication of the mixture homogeneity. At part load, the standard deviation was calculated to be 0.115, while at wide-open throttle and 6000 rpm, the standard deviation value was 0.033, which represent good air-fuel mixture formation for both part load and wide-open throttle operating conditions.

Figure 10:
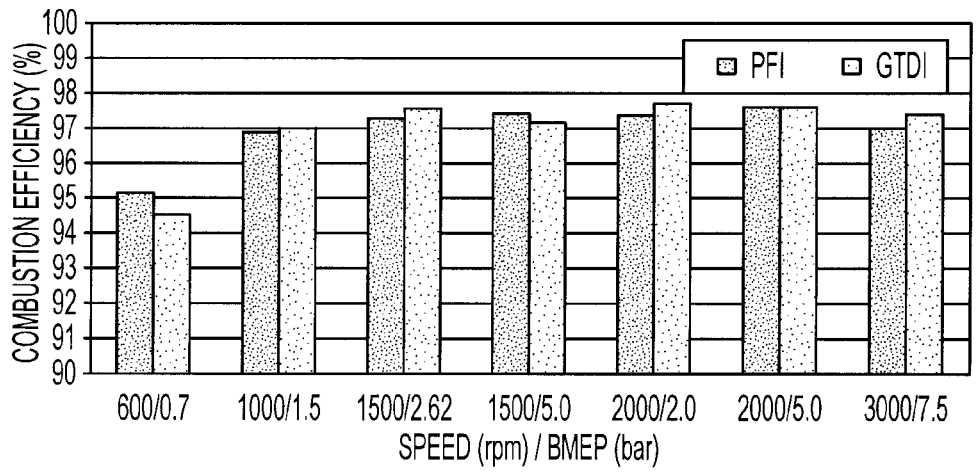
FIG. 10 is a graph illustrating improvement in combustion efficiency using an injector spray pattern according to the present disclosure for part-throttle operation.
Figure 11:
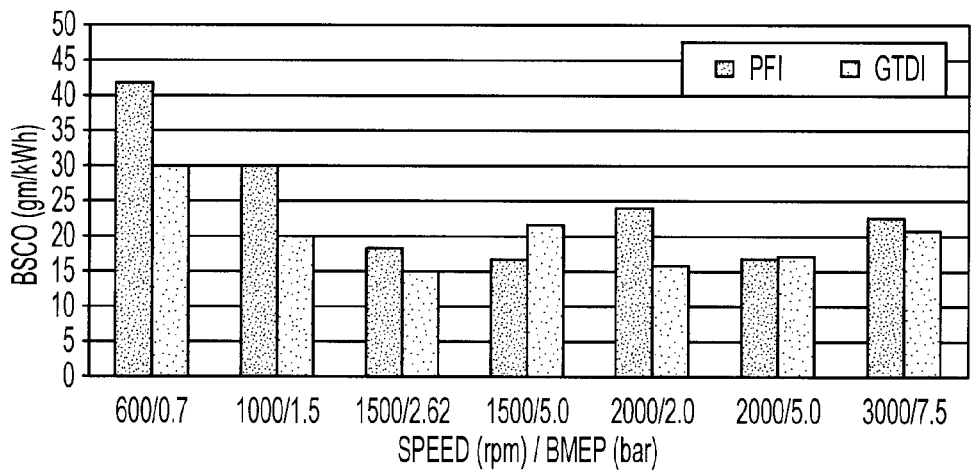
FIG. 11 is a graph illustrating reduction in CO feedgas emissions using an injector spray pattern according to the present disclosure for part-throttle operation.
Figure 12:
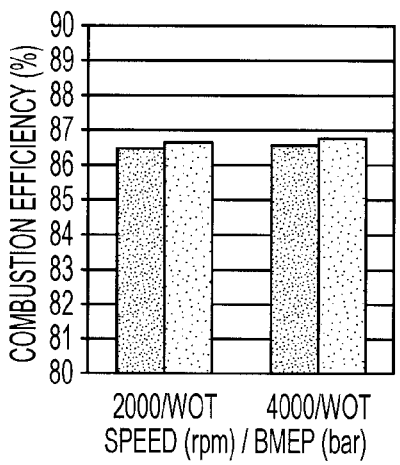
FIG. 12 is a graph illustrating improvement in combustion efficiency using an injector spray pattern according to the present disclosure for wide-open throttle operation.
Figure 13:
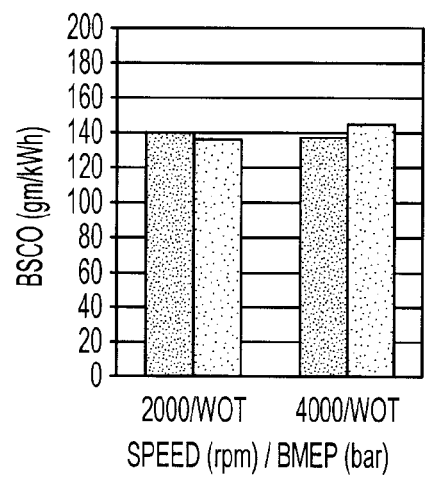
FIG. 13 is a graph illustrating reduction in CO feedgas emissions using an injector spray pattern according to the present disclosure for wide-open throttle operation.
Figure 14:
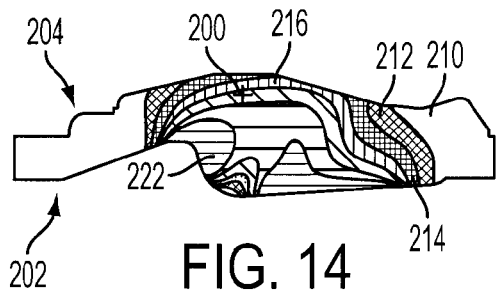
FIGS. 14-17 are contour plots illustrating air/fuel ratio evolution in the Y=0 plane during cold start operation with an injector spray pattern according to the present disclosure.
Figure 15:
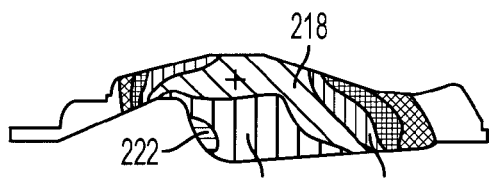
Figure 16:
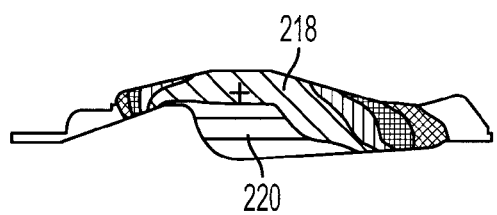
Figure 17:
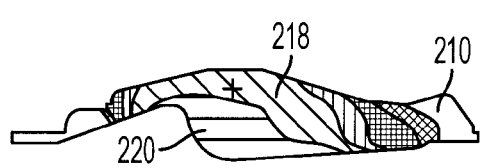

Preliminary dynamometer data obtained from a gasoline direct injection engine equipped with a six-hole injector according to the present disclosure corroborated computer modeling results and indicated good mixing at part load and wide-open throttle operating conditions. FIGS. 10-13 compare operation of a baseline port fuel injected engine to the direct injected engine with six-hole injector. FIGS. 10-11 illustrate operation at part load with improved combustion efficiency at most operating points as shown in FIG. 10 and reduced CO generation at most operating points as shown in FIG. 11. FIGS. 12-13 illustrate combustion efficiency and CO production for wide-open throttle at 2000 rpm and 4000 rpm. Again, the direct injection engine with a six-jet injector shows improved performance based on increased combustion efficiency and reduced CO production at 2000 rpm, with only slightly higher CO production at 4000 rpm operating conditions.

FIGS. 14-17 are plots illustrating air-fuel ratio evolution for crank angles of 690, 710, 720, and 730 degrees, respectively, with an 80/20 split injection during a cold start for a direct injection engine with a fuel injector spray pattern according to the present disclosure. A crank angle of 720 degrees represents the top dead center of the compression stroke. The plots illustrate the spark plug ignition location 200 and the air-fuel ratio distribution between the top surface of the piston 202 and the cylinder roof 204. Region 210 represents an air-fuel ratio of about 16 and above. Region 212 corresponds to an air-fuel ratio of between about 15 and 16. Region 214 corresponds to an air-fuel ratio of between about 14 and 15. Air-fuel ratios of between about 13 and 14 are represented by region 216 with air-fuel ratios of between about 12 and 13 represented by region 218. Similarly, region 220 represents air-fuel ratios of between about 11 and 12, with region 222 representing air-fuel ratios of about 11 and below.

As shown in FIGS. 14-17, the spray jets in the multi-hole injector according to one embodiment of the present disclosure lead to the formation of a rich air-fuel mixture cloud of about 12:1 at the spark plug ignition location 200 during cold start operation, which is a desired value for cold start combustion stability.

Figure 18:
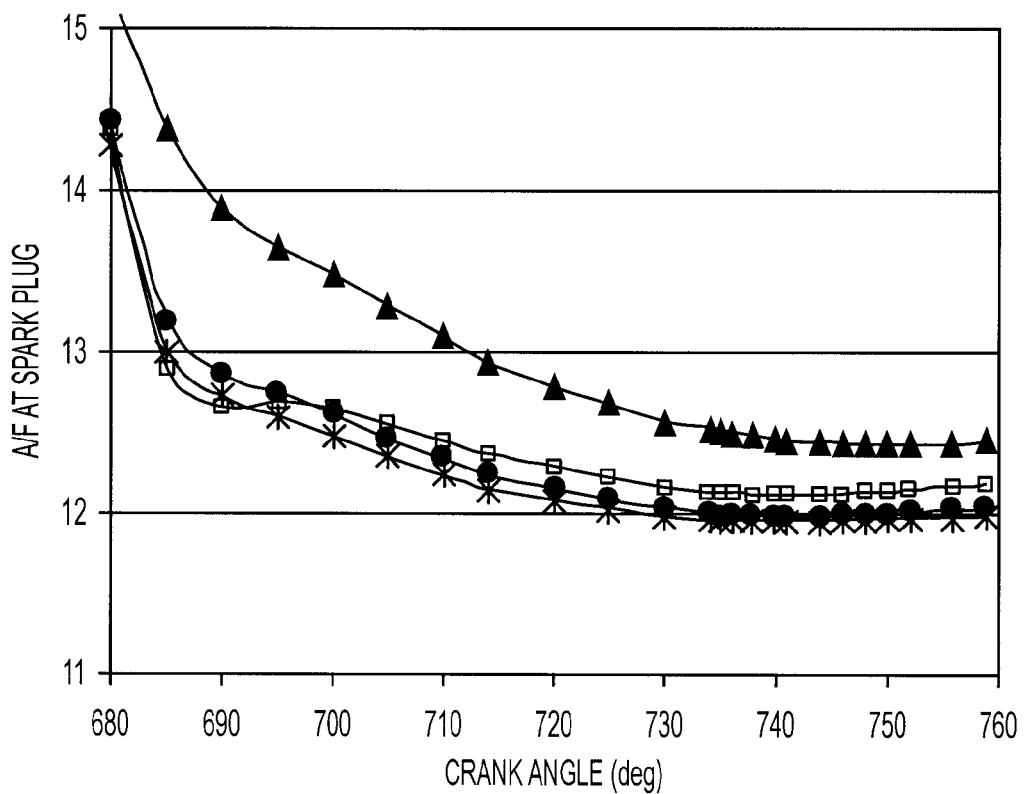
FIG. 18 is a graph comparing air/fuel ratio evolution at the spark plug ignition location during cold start operation using representative embodiments of injector spray patterns according to the present disclosure.

FIG. 18 is a graph illustrating air-fuel ratio at the spark plug ignition location as a function of crank angle during a cold-start for four different injector spray patterns having jet angles within the ranges previously described. As shown in FIG. 18, injector spray patterns according to the present disclosure provide rich air-fuel ratio mixtures near the spark plug ignition location, which leads to good combustion stability during cold starts.

While the best mode has been described in detail, those familiar with the art will recognize various alternative designs and embodiments within the scope of the following claims. Some embodiments may have been described as providing advantages or being preferred over other embodiments or over prior art strategies in regard to one or more desired characteristics. However, as one skilled in the art is aware, different characteristics may provide advantages and be preferred in some applications while being considered less desirable or disadvantageous in other applications. These attributes include, but are not limited to: cost, strength, durability, life cycle cost, marketability, appearance, packaging, size, serviceability, weight, manufacturability, ease of assembly, etc. As such, any embodiments described herein as being preferred or advantageous with respect to one or more characteristics do not preclude embodiments or implementations that may be less desirable or advantageous but are also within the scope of the disclosure.

What is claimed:

1. A direct-injection internal combustion engine operable in a stratified charge and a homogeneous charge mode and having a plurality of cylinders with associated intake/exhaust valves, the engine comprising:

a fuel injector associated with each cylinder and injecting fuel directly into the cylinder during engine operation, the fuel injector having a first plurality of jets oriented to spray fuel generally downward toward a piston bowl and a second plurality of jets oriented to spray fuel generally across the cylinder toward the exhaust valves with at least one jet of the second plurality oriented to spray fuel generally between the intake valves; and an ignition source positioned within each cylinder and having an ignition location position within a fuel/air cloud formed by the first plurality and second plurality of jets during operation of the engine.

2. The engine of claim 1 wherein the first plurality of jets comprises a center jet with two side jets generally symmetrically oriented relative to the center jet to form a fuel-air mixture cloud substantially within the piston bowl during engine starting.

3. The engine of claim 2 wherein the center jet has an off-axis angle of between about 50 degrees to about 55 degrees and the side jets have an off-axis angle of between about 47 degrees to about 55 degrees.

4. The engine of claim 3 wherein the center jet has an angle beta of about 0 degrees and each side jets has an angle beta of between about 14 degrees and about 29 degrees.

5. The engine of claim 1 wherein the second plurality of jets includes a center jet having an off-axis angle of between about 10 degrees to about 15 degrees and two side jets generally symmetrically oriented relative to the center jet and having off-axis angles of between about 33 degrees and about 39 degrees.

6. The engine of claim 5 wherein the center jet has an angle beta of about zero degrees and each side jet has an angle beta of between about 17 degrees and about 27 degrees.

7. The engine of claim 1 wherein the first plurality and second plurality of jets each include half of the total number of jets.

8. A fuel injector for a multiple cylinder direct injection spark ignition internal combustion engine operable in a homogeneous charge mode and a stratified charge mode, the fuel injector comprising:
- a first plurality of jets positioned to spray fuel primarily downward in a cylinder toward a combustion bowl formed in the top surface of a piston; and
- a second plurality of jets position to spray fuel between intake valves primarily across the cylinder toward exhaust valves.

9. The fuel injector of claim 8 wherein the first plurality of jets comprises a first jet having an off-axis angle of between about 50 degrees to about 55 degrees and an angle beta of about 0 degrees, and second and third jets having off-axis angles of between about 47 degrees and about 55 degrees and beta angles of between about 14 degrees and 29 degrees.

10. The fuel injector of claim 8 wherein the second plurality of jets comprises a first jet having an off-axis angle of between about 10 degrees and about 15 degrees and an angle beta of about 0 degrees, and second and third jets having off-axis angles of between about 33 degrees and about 39 degrees and beta angles of between about 17 degrees and about 27 degrees.

11. A method for operating a direct-injection internal combustion engine having a plurality of cylinders each having associated intake/exhaust valves, an ignition source having an associated ignition location, a fuel injector, and a piston having a combustion bowl formed in a top surface thereof, the method comprising:
- injecting fuel in a plurality of fuel jets of the fuel injector directly into a corresponding cylinder, the fuel being injected in at least a first plurality of jets oriented to primarily support operation in a stratified mode and a second plurality of jets oriented to primarily support operation in a homogeneous mode;
- wherein the first plurality of jets includes a first jet oriented at a first angle to spray fuel generally downward toward the piston bowl and the second plurality of jets includes a second jet oriented at a second angle to spray fuel generally between the intake valves and across the cylinder toward the exhaust valves; and
- generating a spark from the ignition source at the ignition location to initiate combustion.

12. The method of claim 11 wherein the first plurality of jets includes a center jet with two side jets generally symmetrically oriented relative to the center jet to form a fuel air mixture cloud substantially within the combustion bowl of the piston during engine starting.

13. The method of claim 12 wherein the center jet has an off-axis angle of between about 50 degrees to about 55 degrees and the side jets have an off-axis angle of between about 47 degrees to about 55 degrees.

14. The method of claim 12 wherein the center jet has an off-axis angle of about 55 degrees and the side jets have an off-axis angle of about 47 degrees.

15. The method of claim 11 wherein the second plurality of jets includes a center jet with two side jets generally symmetrically oriented relative to the center jet.

16. The method of claim 15 wherein the center jet has an off-axis angle of between about 10 degrees to about 15 degrees and wherein the side jets have an off-axis angle of between about 33 degrees to about 39 degrees.

17. The method of claim 15 wherein the center jet has an off-axis angle of about 10 degrees and wherein the side jets have an off-axis angle of about 34 degrees.

18. The method of claim 11 wherein the first and second pluralities of jets each include half of the total number of jets.

19. The method of claim 11 wherein the first plurality of jets are oriented such that fuel penetrates into the cylinder generally farther than fuel from the second plurality of jets as measured along the cylinder axis.

20. The method of claim 11 wherein the second plurality of jets are oriented such that fuel penetrates into the cylinder generally farther than fuel from the first plurality of jets as measured normal to the cylinder axis.

* * * * *